US012480757B2

(12) United States Patent
Stambke et al.

(10) Patent No.: US 12,480,757 B2
(45) Date of Patent: Nov. 25, 2025

(54) METHOD FOR DISTANCE MEASUREMENT BY MEANS OF OCT AND ASSOCIATED COMPUTER PROGRAM PRODUCT (71) Applicant: TRUMPF Laser GmbH, Schramberg (DE)

(72) Inventors: Martin Stambke, Dunningen (DE); Jan-Patrick Hermani, Markgroeningen (DE)

(73) Assignee: TRUMPF LASER GMBH, Schramberg (DE)

( * ) Notice: Subject to any disclaimer, the term of this patent is extended or adjusted under 35 U.S.C. 154(b) by 747 days.

(21) Appl. No.: 17/829,379

(22) Filed: Jun. 1, 2022

(65) Prior Publication Data
US 2022/0290973 A1 Sep. 15, 2022

Related U.S. Application Data (63) Continuation of application No. PCT/EP2020/084161, filed on Dec. 1, 2020.

(30) Foreign Application Priority Data
Dec. 2, 2019 (DE) .................. 10 2019 132 619.2

(51) Int. Cl.
G01B 11/02 (2006.01)
A61B 3/10 (2006.01)
(Continued)

(52) U.S. Cl.
CPC .......... G01B 11/026 (2013.01); B23K 26/032 (2013.01); G01B 9/02091 (2013.01);
(Continued)

(58) Field of Classification Search
CPC ............... G01B 11/026; G01B 9/0209; G01B 11/0608; G01B 9/02091; G01B 11/0675;
(Continued)

(56) References Cited

U.S. PATENT DOCUMENTS 6,667,458 B1 † 12/2003 Sirat
8,822,875 B2 * 9/2014 Webster ............... G01B 9/0203
219/121.13
(Continued)

FOREIGN PATENT DOCUMENTS

CN 1611319 A 5/2005
CN 105277568 A 1/2016
(Continued)

OTHER PUBLICATIONS

Raele, et al., "Development of a Dynamic Interferometric Focusing System for Femtosecond Laser Machining," *Proceedings of SPIE 2017*, pp. 1-13, Feb. 17, 2017, SPIE, Bellingham, WA, USA.
(Continued)

*Primary Examiner* — Cara E Rakowski
*Assistant Examiner* — Ruby L Kauffman
(74) *Attorney, Agent, or Firm* — LEYDIG, VOIT & MAYER, LTD.

(57) ABSTRACT

A method for distance measurement includes: (a) measuring a focus distance between a z-focus position of a processing laser beam and a reference surface, and measuring a reference distance between a reference arm mirror of a coherence tomography apparatus and the reference surface using a measurement beam. The processing laser beam is directed onto the reference surface via a laser processing optical unit. The measurement beam is directed onto a same point of the reference surface as the processing beam or onto a point of the reference surface next to an impingement point of the processing beam. The method further includes (b) measuring a workpiece distance between the reference arm mirror and a workpiece surface using the measurement beam directed onto the workpiece surface, and (c) determining the distance between workpiece surface and the z-focus position
(Continued)

based on the reference distance and the workpiece distance and the focus distance.

9 Claims, 5 Drawing Sheets

(51) Int. Cl.
    *A61B 5/00*         (2006.01)
    *B23K 26/03*       (2006.01)
    *G01B 9/0209*     (2022.01)
    *G01B 9/02091*    (2022.01)
    *G01B 11/06*      (2006.01)

(52) U.S. Cl.
    CPC ........ *G01B 11/0608* (2013.01); *G01B 9/0209* (2013.01); *G01B 11/0675* (2013.01)

(58) Field of Classification Search
    CPC ..... G01B 11/2441; G01B 11/14; A61B 3/102; A61B 5/0066; B23K 26/046; B23K 26/032; B23K 26/082
    See application file for complete search history.

(56) References Cited

U.S. PATENT DOCUMENTS

| | | |
|---|---|---|
| 10,376,992 B2 | 8/2019 | Hildebrand et al. |
| 2005/0109742 A1 | 5/2005 | Nagai et al. |
| 2010/0155375 A1 | 6/2010 | Dietz et al. |
| 2014/0027421 A1 | 1/2014 | Notheis |
| 2015/0338210 A1 | 11/2015 | Lessmüller et al. |
| 2016/0202045 A1* | 7/2016 | Schönleber .......... B23K 26/046 356/497 |
| 2017/0157711 A1 | 6/2017 | Spiess et al. |
| 2019/0015931 A1* | 1/2019 | Kogel-Hollacher ... B23K 26/34 |
| 2022/0290973 A1 | 9/2022 | Stambke et al. |

FOREIGN PATENT DOCUMENTS

| | | |
|---|---|---|
| CN | 105658372 A | 6/2016 |
| CN | 105829828 A | 8/2016 |
| CN | 106030238 A | 10/2016 |
| CN | 106660168 A | 5/2017 |
| DE | 102011006553 A1 | 10/2012 |
| DE | 102016001661 B3 | 4/2017 |
| DE | 102016014564 A1 | 6/2018 |
| DE | 102017001353 A1 | 8/2018 |
| EP | 1977850 A | 10/2008 |

OTHER PUBLICATIONS

Rouwen, et al., "Monitoring of Laser Material Processing Using Machine Integrated Low-Coherence Interferometry," *Proceedings of SPIE 2017*, pp. 14, Jun. 13, 2017, SPIE, Bellingham, WA, USA.
Ji, et al., "Real-Time Depth Monitoring and Control of Laser Machining Through Scanning Beam Delivery System," *Journal of Physics D: Applied Physics* 48, 15, pp. 1-8; Mar. 25, 2015, IOP Publishing Ltd., Bristol, UK.
Dorsch, et al., "Controlling Laser Processing Via Optical Coherence Topography," *Proceedings of SPIE 2019*, pp. 1-8, Feb. 27, 2019, SPIE, Bellingham, WA, USA.
Third-Party Pre-Issuance Submission for U.S. Appl. No. 17/829,379 (379 Application).†

\* cited by examiner
† cited by third party

METHOD FOR DISTANCE MEASUREMENT BY MEANS OF OCT AND ASSOCIATED COMPUTER PROGRAM PRODUCT

CROSS REFERENCE TO RELATED APPLICATIONS

This application is a continuation of International Application No. PCT/EP2020/084161 (WO 2021/110698 A1), filed on Dec. 1, 2020, and claims benefit to German Patent Application No. DE 10 2019 132 619.2, filed on Dec. 2, 2019. The aforementioned applications are hereby incorporated by reference herein.

FIELD

Embodiments of the present invention relate to a method for distance measurement by means of an optical coherence tomography (OCT) apparatus, the measurement beam of which is directed via a laser processing optical unit, in particular via a scanner optical unit, onto a workpiece surface.

BACKGROUND

The OCT measurement technique is an interferometric relative distance measurement in which the length of the optical path length of a measurement section is compared with the path length of a reference section. Temperature differences between measurement and reference sections result in thermal drifts of the measurement value. These drifts are not relevant to relative measurements, such as e.g. the height difference of a component or a partial penetration welding depth measurement. In the case of absolute measurements, in particular for closed-loop control of the absolute distance between laser processing optical unit and workpiece, these thermal drifts pose a problem since they corrupt the real distance value. Usually the temperatures in the measurement and reference sections are measured, and the drift is then compensated for in a complex manner by means of mathematical models.

The absolute working distance between laser processing optical unit and workpiece is ascertained at present by the use of laser triangulation in combination with an observation camera. A disadvantage of this solution in the case of scanner optical units, however, is the restriction to a specific processing position (generally the position in the undeflected state of the scanner optical unit).

SUMMARY

Embodiments of the present invention provide a method for distance measurement using an optical coherence tomography apparatus. The method includes measuring a focus distance between a z-focus position of a processing laser beam and a reference surface, and measuring a reference distance between a reference arm mirror of the coherence tomography apparatus and the reference surface using a measurement beam. The processing laser beam is directed onto the reference surface via a laser processing optical unit. The measurement beam is directed onto a same point of the reference surface as the processing beam or onto a point of the reference surface next to an impingement point of the processing beam. The method further includes measuring a workpiece distance between the reference arm mirror and a workpiece surface using the measurement beam directed onto the workpiece surface, and determining the distance between workpiece surface and the z-focus position based on the reference distance and the workpiece distance and the measured focus distance.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Against this background, embodiments of the invention provides an OCT measurement method by which distances which are relevant in particular during the laser processing of workpieces can be measured.

Embodiments of the invention provide a method for distance measurement by means of an OCT apparatus, the measurement beam of which is directed via a laser processing optical unit, in particular via a scanner optical unit, onto a workpiece surface, comprising the following method steps:

a) measuring the focus distance between the z-focus position of a processing laser beam and a reference surface, said processing laser beam being directed onto said reference surface via the laser processing optical unit, and measuring a reference distance between a reference arm mirror of the coherence tomography apparatus and the reference surface by means of the measurement beam directed onto the same point of the reference surface as the processing beam or onto a point of the reference surface next to the impingement point of the processing beam;

b) measuring a workpiece distance between the reference arm mirror and a workpiece surface by means of the measurement beam directed onto the workpiece surface, and c) determining the distance between workpiece surface and z-focus position on the basis of the measured reference and workpiece distances and the measured focus distance.

Preferably, in step (a) the processing laser beam and the measurement beam are directed onto the reference surface in each case perpendicularly, and in step (b) the measurement beam is directed onto the workpiece surface perpendicularly or obliquely.

According to embodiments of the invention, the laser processing optical unit is first aligned with a fixed reference point of the reference surface. This can be done by moving the entire laser processing optical unit at right angles to the optical axis running in the z-direction, i.e. in the x-, y-direction, or, in the case of a laser processing optical unit embodied as a scanner optical unit, alternatively by deflecting the scanner mirror(s). Then, firstly, the z-focus position of the processing laser beam relative to the reference surface is ascertained, e.g. by means of the method known from DE 10 2011 006 553 A1, and, secondly, with an identical setting of the laser processing optical unit, the reference distance between reference arm mirror and reference surface is measured by means of the measurement beam. These two measurements enable the focus position to be assigned to the OCT measuring system. Afterward, the measurement beam is directed onto a workpiece, either by moving the laser processing optical unit in the x-, y-direction or by deflecting the scanner mirror(s), and the workpiece distance between reference arm mirror and workpiece surface is measured by means of the measurement beam. The distance between focus position and workpiece surface can be determined on the basis of the measured reference and workpiece distances and the measured focus distance. The measurements in steps (a) and (b) are as far as possible carried out promptly enough that a thermal drift occurring between the measurements is negligible. Complicated temperature-regulating measures and error-prone temperature measurement at points as input variables for a mathematical correction are rendered superfluous by the method according to embodiments of the invention.

In the simplest case, namely if the laser processing optical unit is situated at the same z-position in step (b) as in step (a) and the measurement beams are directed onto the reference and workpiece surfaces perpendicularly in each case, the distance between focus position and workpiece surface corresponds to the measured workpiece distance minus the difference between the measured reference distance and the measured focus distance. For the case where in step (b) the measurement beam is directed onto the workpiece surface obliquely, the workpiece distance can be determined on the basis of the measured oblique workpiece distance and the known deflection angle of the laser processing optical unit. For the case, finally, where a movement of the laser processing optical unit in the z-direction has taken place between steps (a) and (b), this is likewise taken into account in step (c) when determining the distance.

Preferably, the z-focus position of the processing laser beam directed onto the workpiece surface relative to the workpiece surface is set on the basis of the distance determined, e.g. by the laser processing optical unit or a focusing optical unit being moved in the z-direction until the desired focus distance with respect to the workpiece surface is set.

A target distance between workpiece surface and z-focus position, said target distance being stored in a machine controller, is advantageously corrected to the distance determined, e.g. by means of a corresponding offset value.

Preferably, the current distance can be determined cyclically on the basis of currently measured reference and workpiece distances, with or without step (a). In the event of deviation from the value previously determined and stored (e.g. on account of thermal drifts), a target focus distance with respect to the workpiece surface, said target focus distance being stored in a controller, is corrected to the distance currently determined.

The object mentioned above is also achieved according to embodiments of the invention by means of a method for distance measurement by means of an OCT apparatus, the measurement beam of which is directed via a laser processing optical unit, in particular via a scanner optical unit, onto a workpiece surface, comprising the following method steps:

measuring the workpiece distance between a reference arm mirror of the coherence tomography apparatus and the workpiece surface by means of two measurement beams directed onto the workpiece surface in each case at different angles of incidence by the laser processing optical unit; and determining the distance between deflection optical unit and workpiece surface on the basis of the two angles of incidence and the difference between the two measured workpiece distances.

Advantageously, in this case one of the two measurement beams is directed onto the workpiece surface perpendicularly.

According to embodiments of the invention, the OCT measurement beam is positioned on a planar workpiece surface e.g. in an undeflected manner and in a manner deflected by the angle by the scanner optical unit. The path length difference between the two OCT distance measurements is a function of the distance between scanner optical unit and workpiece surface, such that the distance can be determined on the basis of the deflection angles and the length difference between the two measured workpiece distances. A deviation of the distance from a known target value (e.g. from a dimensioned drawing of the scanner optical unit) can thus be measured and corrected.

Preferably, a surface offset that is present in the z-direction between the two impingement points of the two measurement beams is taken into account when determining the distance. In the case of a non-planar workpiece surface, the method can likewise be applied but it is necessary to know the surface offset of the workpiece that is present in the z-direction between the two measurement positions, i.e. e.g. between undeflected and deflected measurement positions.

Particularly advantageously, a target distance between deflection optical unit and workpiece surface, said target distance being stored in a machine controller, is corrected to the distance determined.

Embodiments of the invention also relate to a computer program product having code means adapted for carrying out all of the steps of the method according to embodiments of the invention when the program runs on a machine controller of a laser processing machine, said machine controller controlling the laser processing optical unit.

Further advantages and advantageous configurations of the subject matter of the invention can be gathered from the description, the drawings and the claims. Likewise, the features mentioned above and those that will be explained further can be used in each case by themselves or as a plurality in any desired combinations. The embodiments shown and described should not be understood as an exhaustive enumeration, but rather are of exemplary character for outlining embodiments of the invention.

Figure 1A:
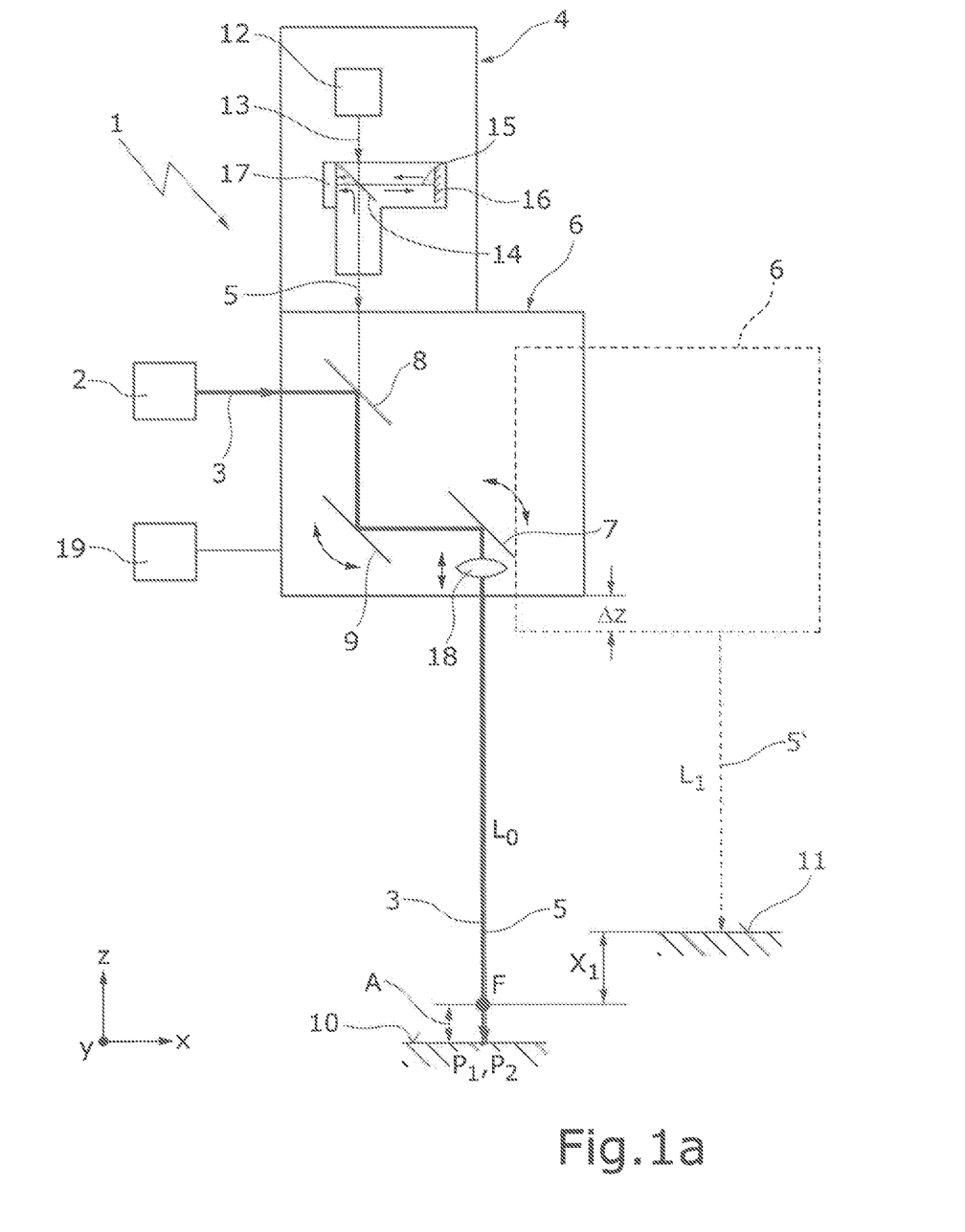
FIGS. 1a and 1b schematically show a laser processing machine suitable for carrying out a first OCT measurement method according to embodiments of the invention, with a reference surface for measuring the focus position of a processing laser beam as reference for OCT distance measurements.
Figure 1B:
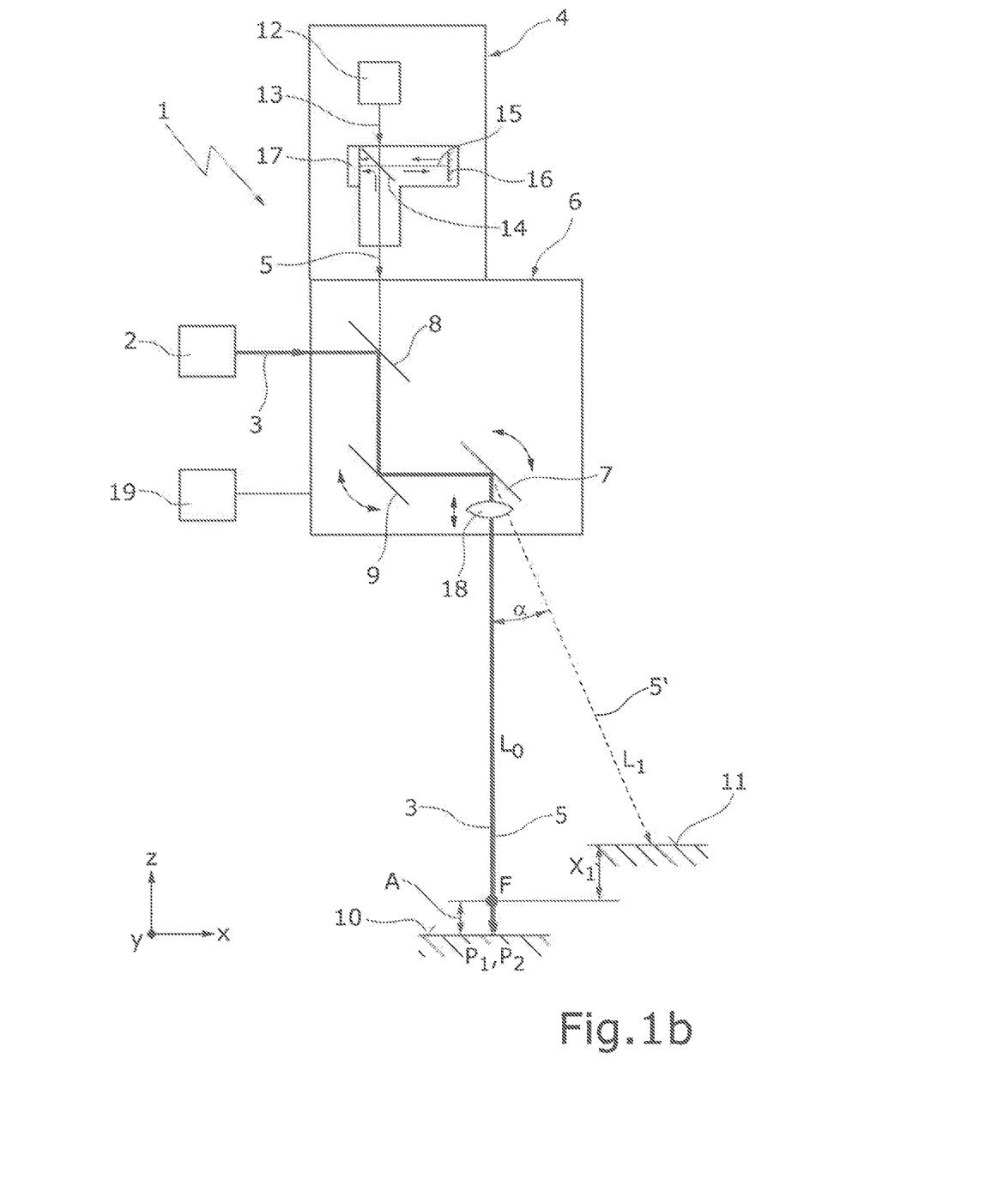

The laser processing machine 1 shown schematically in FIGS. 1a, 1b comprises a laser beam generator 2 for generating a processing laser beam 3, an optical coherence tomography (OCT) apparatus 4 for generating a measurement beam 5, and a processing head 6, which is movable in the x-, y- and z-directions, with a scanner unit 7 for one- or two-dimensionally deflecting the two beams 3, 5 in the x-, y-direction. The scanner optical unit 7 can have for example one scanner mirror deflectable about two axes, or two scanner mirrors each deflectable about one axis. In the processing head 6, the two beams 3, 5 are collinearly aligned with one another by way of an inclined mirror 8, which transmits the measurement beam 5 and diverts the processing laser beam 3, and are fed to the common scanner optical unit 7 by means of a diverting mirror 9. By way of the scanner optical unit 7 and/or by moving the processing head 6 in the x-, y-direction, it is possible for the two beams 3, 5 to be directed onto a reference surface 10 or onto a workpiece surface 11. Optionally, an OCT scanner (not shown) can be arranged in the beam path of the measurement beam 5 upstream of the mirror 8 in order to be able to deflect the measurement beam 5 relative to the processing laser beam 3.

The OCT apparatus 4 is secured to the processing head 6 and has in a known manner an OCT light source (e.g. superluminescence diode) 12 for generating an OCT beam 13, a beam splitter 14 for splitting the OCT beam 13 into the measurement beam 5 and a reference beam 15. The measurement beam 5 impinges on the reference or workpiece surface 10, 11, at which the measurement beam 5 is at least partly reflected and guided back to the beam splitter 14, which is nontransmissive or partly transmissive in this direction. The reference beam 15 is reflected by a reference arm mirror 16 and likewise guided back to the beam splitter 14. The superimposition of the two reflected beams 5, 15 is finally detected by a detector (OCT sensor) 17 in order to determine, by means of the comparison of the optical path lengths of the measurement and reference sections, a distance—relative to the reference section—between the reference arm mirror 16 and the reference or workpiece surface 10, 11. Instead of the entire OCT apparatus 4 being secured to the movable processing head 6 as shown, alternatively individual components of the OCT apparatus 4 that are noncritical with regard to a propagation time difference of measurement and reference beams 5, 15, such as e.g. the OCT light source 12 and the OCT sensor 17, can also be secured elsewhere, in particular in a stationary manner.

In order to calibrate the workpiece surface 11 relative to the z-focus position F of the processing laser beam 3, the following procedure is adopted.

The focus position F of the processing laser beam 3 aligned with the reference surface 10 at right angles is determined relative to the reference surface 10, e.g. by means of the measurement method known from DE 10 2011 006 553 A1. In this case, a measurement pick-up having a pinhole stop with a power detector provided behind the pinhole stop is arranged on the reference surface 10. The hole diameter of the pinhole stop approximately corresponds to the focus diameter of the processing laser beam 3. The processing laser beam 3 is moved—by means of a focusing optical unit 18 of the processing head 6 or by movement of the processing head 6 in the z-direction—in a z-grid and at each of the grid points the laser power is measured by the power detector. From the measurement values, the peak value, i.e. the z-focus position F of the processing laser beam 3, can then be determined as a distance A relative to the reference surface 10. Instead of being arranged downstream of the scanner optical unit 7 as shown, the focusing optical unit 18 can also be arranged upstream of the scanner optical unit 7, specifically either upstream or downstream of the measurement beam input coupling (mirror 8).

Subsequently, a reference distance L0 between reference arm mirror 16 and reference surface 10 is measured by means of the measurement beam 5 directed at the same angle onto the same point P1 of the reference surface 10 as the processing beam 3. Alternatively, the measurement beam 5 can also be directed onto a point P2 of the reference surface 10 as close as possible next to the impingement point P1 of the processing beam 3; the smaller the distance between the two points P1, P2, the more accurate the referencing of the measurement beam 5 to the focus position F.

Finally, as illustrated in a dashed manner, the measurement beam 5' is aligned with the workpiece surface 11, e.g. by movement of the processing head 6 in the x-y-direction (FIG. 1a) or by deflection of the scanner optical unit 7 or of the scanner mirror by the deflection angle $\alpha$ (FIG. 1b). A workpiece distance L1 between reference arm mirror 16 and workpiece surface 11 is measured by means of the measurement beam 5'. A distance X1 between focus position F and workpiece surface 11 can be determined on the basis of the measured reference and workpiece distances L0, L1 and the measured distance A.

In the case of the measurement beam 5' directed onto the workpiece surface 11 perpendicularly in FIG. 1a, the following holds true for the distance X1:

$$X1 = L0 - L1 - A - \Delta z,$$

where $\Delta z$ denotes a z-displacement of the focus position F that has taken place between the measurements of the reference and workpiece distances L0, L1. This z-displacement $\Delta z$ can be effected for example by means of a z-movement of the processing optical unit 7, this z-movement being illustrated in a dashed manner in FIG. 1a, or by means of a z-movement of the focus optical unit 18.

In the case of the measurement beam 5' directed onto the workpiece surface 11 at the angle $\alpha(\alpha \neq 0°)$ in FIG. 1b, the following holds true for the distance X1:

$$X1 = L0 - L1 \cos(\alpha) - A - \Delta z,$$

where $\Delta z$ denotes a z-displacement of the focus position F that has taken place between the measurements of the reference and workpiece distances L0, L1.

The measurements of the reference and workpiece lengths L0, L1 and of the focus position F can be effected in any desired order, but may need be effected promptly enough that a thermal drift between the measurements is negligible.

The focus position F of the processing laser beam 3 directed onto the workpiece surface 11 relative to the workpiece surface 11 can be set on the basis of the distance X1 determined, e.g. by the processing head 6 or the focusing optical unit 18 being moved in the z-direction until a desired target distance between the focus position F and the workpiece surface 11 is set.

The movement of the laser processing optical unit 7, in particular the deflection of the scanner optical unit, and also the measurements of the reference and workpiece distances L0, L1 can be controlled by a machine controller 19, which can also perform the determination of the distance X1. The measurements of the reference and workpiece distances L0, L1 can be carried out cyclically—with or without renewed measurement of the focus position F of the processing laser beam 3. In the event of deviation from the distance X1 previously determined and stored in the machine controller 19 (e.g. on account of thermal drifts), the target distance between reference and workpiece surfaces 10, 11, said target distance being stored in the machine controller 19, can be corrected to the distance X1 currently determined.

Figure 2A:
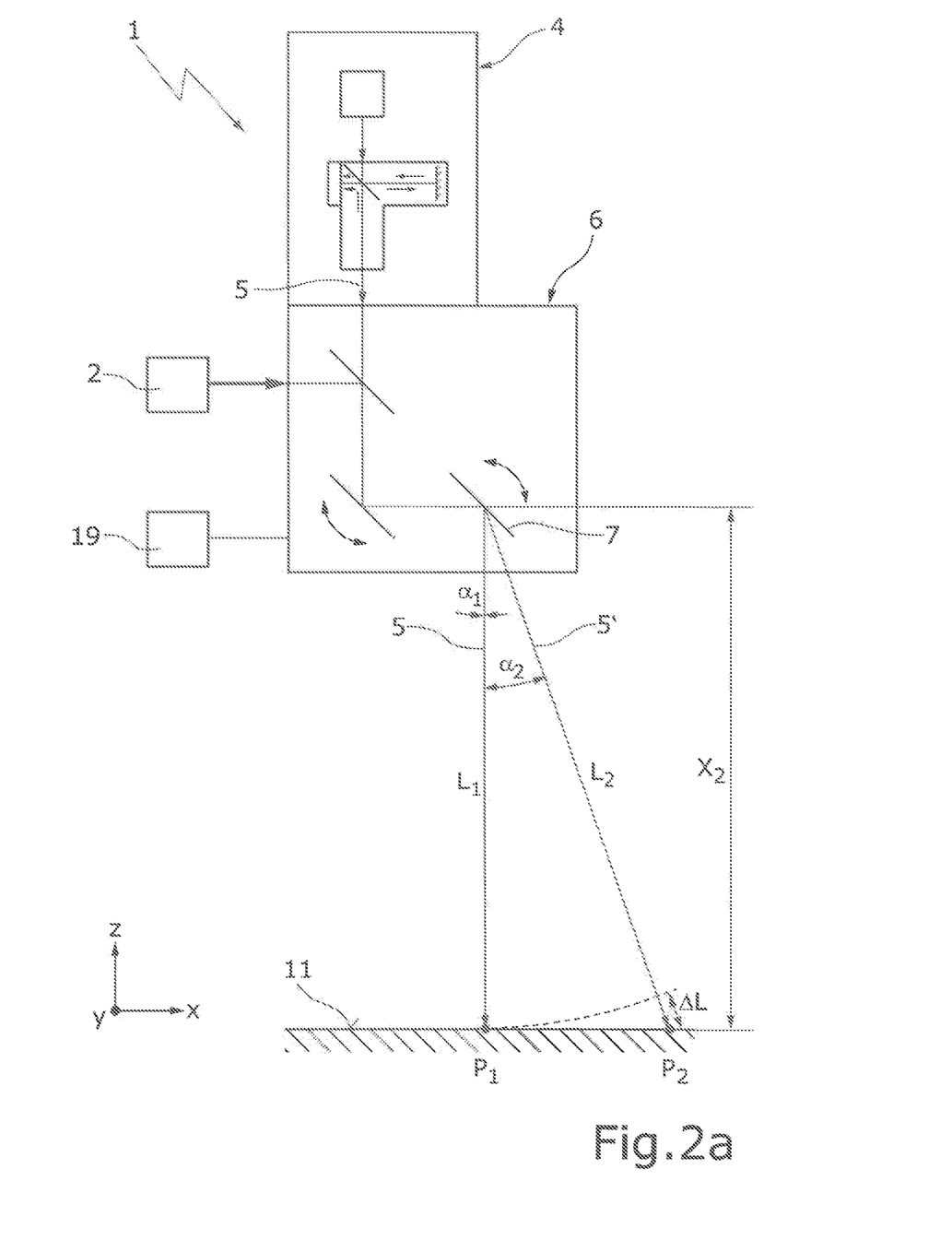
FIGS. 2a, 2b, and 2c show a second OCT measurement method according to embodiments of the invention, which is able to be carried out by the laser processing machine from FIG. 1, wherein OCT distance measurements are carried out on a planar workpiece surface (FIG. 2a), a stepped workpiece surface (FIG. 2b) and a curved workpiece surface (FIG. 2c).
Figure 2B:
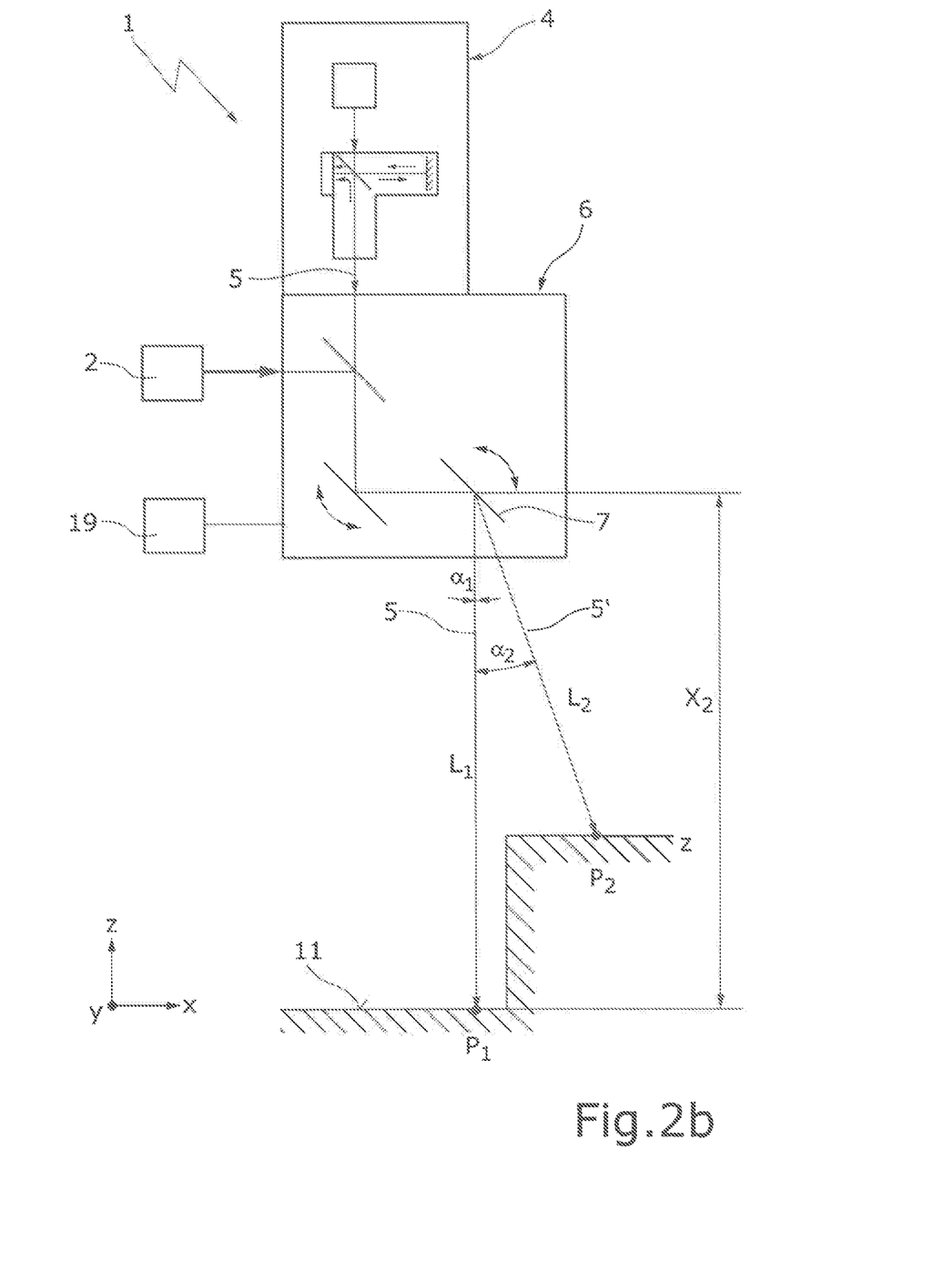
Figure 2C:
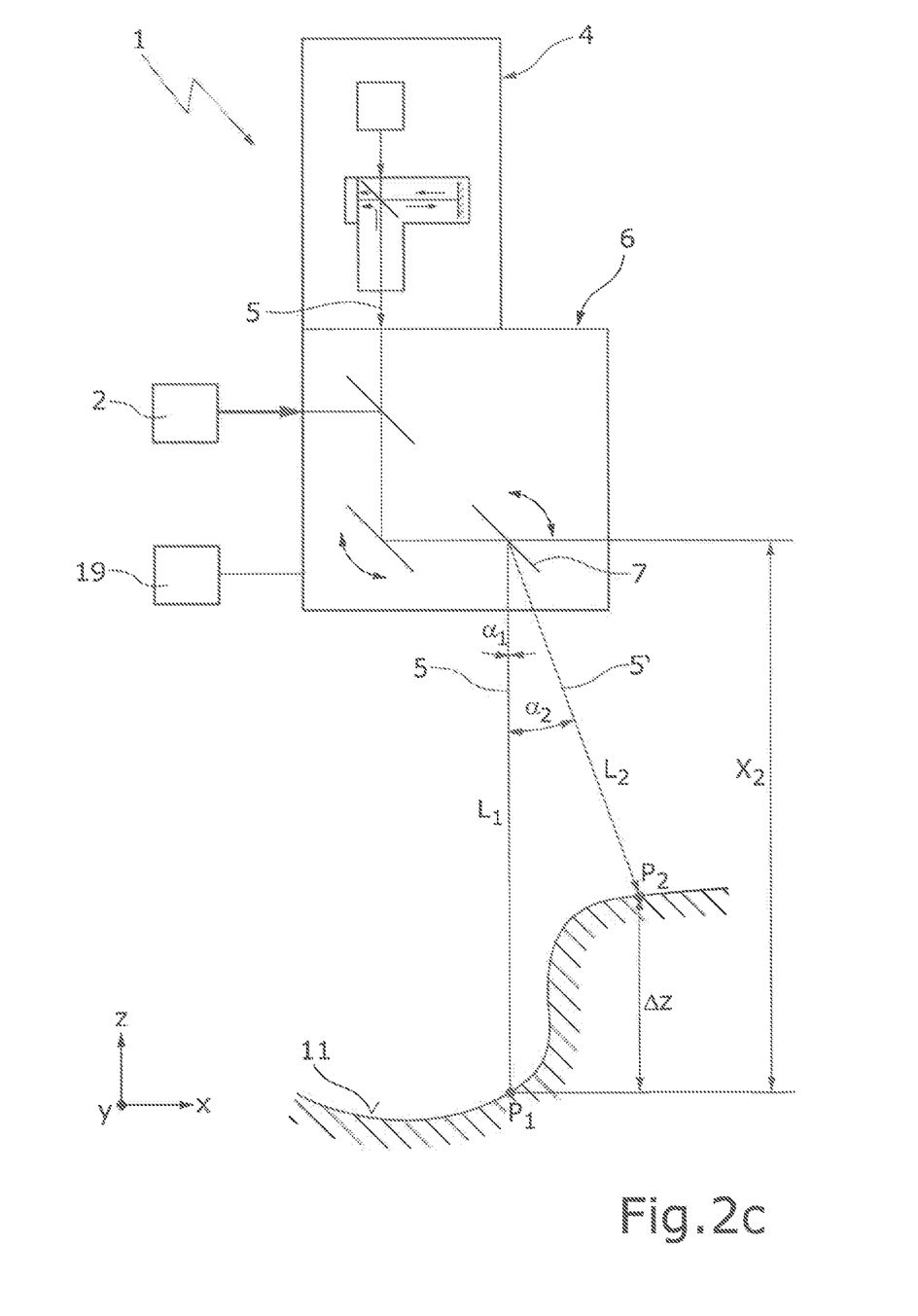

FIGS. 2a-2c show a second OCT measurement method for determining an absolute distance X2 between the scanner optical unit 7 and the workpiece surface 11, which method is able to be carried out by the laser processing machine 1, wherein the OCT distance measurements are carried out on a planar workpiece surface 11 (FIG. 2a), a workpiece surface 11 stepped in the z-direction (FIG. 2b) and a workpiece surface 11 arbitrarily curved in the z-direction (FIG. 2c).

The workpiece distances L1, L2—relative to the reference section—between the reference arm mirror 16 and the workpiece surface 11 are measured by means of two measurement beams 5, 5' directed onto the workpiece surface 11 in each case at different angles α1 (here: α1=0°), α2 of incidence. On the basis of the two angles α1, α2 of incidence and the length difference ΔL=L1−L2 between the two measured workpiece distances L1, L2, it is possible to determine the absolute distance X2 between the scanner optical unit 7, to put it more precisely the tilt axis of the scanner mirror, and the workpiece surface 11:

$$X_2 = \frac{\Delta L}{\left(\frac{1}{\cos\alpha_2} - \frac{1}{\cos\alpha_1}\right)} - \frac{\Delta z}{\cos\alpha_2}$$

where Δz denotes a z-surface offset of the workpiece surface 11 between the two measurement points P1, P2.

In the case of FIG. 2a, i.e. in the case of a planar workpiece surface 11 (Δz=0) and in the case of a measurement beam 5 directed onto the workpiece surface 11 perpendicularly (α1=0°), the following holds true for the absolute distance X2:

$$X_2 = \frac{\Delta L}{\left(\frac{1}{\cos\alpha_2} - 1\right)}$$

In the case of FIGS. 2b and 2c, i.e. in the case of a z-surface offset Δz (Δz≠0) between the two measurement points P1, P2 and in the case of a measurement beam 5 directed onto the workpiece surface 11 perpendicularly (α1=0°), the following holds true for the absolute distance X2:

$$X_2 = \frac{\Delta L}{\left(\frac{1}{\cos\alpha_2} - 1\right)} - \frac{\Delta z}{\cos\alpha_2}$$

A target distance between deflection optical unit 7 and workpiece surface 11, said target distance being stored in the machine controller 19, can be corrected to the absolute distance X2 determined.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for distance measurement using an optical coherence tomography apparatus, the method comprising:

(a) measuring a focus distance between a z-focus position of a processing laser beam and a reference surface, the processing laser beam being directed onto the reference surface via a laser processing optical unit, directing a measurement beam onto the reference surface, and measuring a reference distance between a reference arm mirror of the coherence tomography apparatus and the reference surface using the measurement beam, the measurement beam being directed onto a same point of the reference surface as the processing beam or onto a point of the reference surface next to an impingement point of the processing beam;

(b) directing the measurement beam onto a workpiece surface, and measuring a workpiece distance between the reference arm mirror and the workpiece surface using the measurement beam, and (c) determining the distance between workpiece surface and the z-focus position based on the reference distance and the workpiece distance and the measured focus distance.

2. The method as claimed in claim 1, wherein, in step (a), the processing laser beam and the measurement beam are directed onto the reference surface perpendicularly.

3. The method as claimed in claim 1, wherein, in step (b), the measurement beam is directed onto the workpiece surface perpendicularly or obliquely.

4. The method as claimed in claim 1, wherein, in step (c), a movement of a processing head or of a focusing optical unit of the processing head that has taken place in a z-direction between step (a) and step (b) is taken into account when determining the distance.

5. The method as claimed in claim 1, wherein in step (b) the measurement beam is directed onto the workpiece surface by the laser processing optical unit or by an x-y relative movement between the laser processing optical unit and the workpiece.

6. The method as claimed in claim 1, wherein the z-focus position of the processing laser beam directed onto the workpiece surface relative to the workpiece surface is set based on the distance as determined.

7. The method as claimed in claim 1, wherein a target distance between workpiece surface and the z-focus position is corrected to the distance as determined, wherein the target distance is stored in a machine controller.

8. The method as claimed in claim 1, wherein the distance is determined cyclically based on a currently measured reference distance and a currently measured workpiece distance.

9. A non-transitory computer-readable medium having a program code embodied thereon, the program code, when executed by a machine controller of a laser processing machine, causing the machine controller to perform the method as claimed in claim 1.

* * * * *